United States Patent
Mene et al.

(10) Patent No.: US 11,835,718 B1
(45) Date of Patent: Dec. 5, 2023

(54) AUGMENTED NOTIFICATIONS FOR VIBRATIONS

(71) Applicant: INTERNATIONAL BUSINESS MACHINES CORPORATION, Armonk, NY (US)

(72) Inventors: Atul Mene, Morrisville, NC (US); Jeremy R. Fox, Georgetown, TX (US); Tushar Agrawal, West Fargo, ND (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/846,164

(22) Filed: Jun. 22, 2022

(51) Int. Cl.
  *G02B 27/00* (2006.01)
  *G06F 3/01* (2006.01)
  *G01S 15/04* (2006.01)
  *G02B 27/01* (2006.01)

(52) U.S. Cl.
  CPC .......... *G02B 27/0093* (2013.01); *G01S 15/04* (2013.01); *G06F 3/013* (2013.01); *G02B 27/017* (2013.01)

(58) Field of Classification Search
  CPC ............................ G06F 3/013; G02B 27/0093
  See application file for complete search history.

(56) References Cited

U.S. PATENT DOCUMENTS

| | | | |
|---|---|---|---|
| 10,500,496 B2 | 12/2019 | Clark et al. | |
| 11,023,818 B2 * | 6/2021 | Awiszus | G06N 20/00 |
| 2002/0191004 A1 | 12/2002 | Ebersole | |
| 2013/0002425 A1 | 1/2013 | Hatch et al. | |
| 2016/0270656 A1 * | 9/2016 | Samec | A61B 3/102 |
| 2017/0330444 A1 * | 11/2017 | M R | G08B 25/016 |
| 2021/0221502 A1 | 7/2021 | Godi | |

FOREIGN PATENT DOCUMENTS

| | | |
|---|---|---|
| CN | 105893928 A | 8/2016 |
| CN | 106525445 B | 11/2019 |
| WO | 2017184702 A1 | 10/2017 |

OTHER PUBLICATIONS

Frigo et al., "Augmented Reality in Aerospace Manufacturing: A Review," Journal of Industrial and Intelligent Information vol. 4, No. 2, Mar. 2016, 6 pages.

Panfil et al., "Reasoning in Machinery Diagnostics Aided by Augmented Reality System," Proceedings of AI-METH Symposium in Gliwice, 2005, 6 pages.

(Continued)

*Primary Examiner* — Nelson M Rosario
*Assistant Examiner* — Scott D Au
(74) *Attorney, Agent, or Firm* — Mark Bergner (57) ABSTRACT

One or more environmental vibrations that originate from a vibration source are detected by a wearable display device. The wearable display device is worn by a user. The vibration source is located in an environment that is proximate to the wearable display device. An alert condition related to the vibration source is identified, based on the one or more environmental vibrations. An augmented notification for the wearable display device is generated in response to the alert condition. The augmented notification provided, by the wearable display device, to the user.

12 Claims, 5 Drawing Sheets

(56) References Cited

OTHER PUBLICATIONS

Kokkas et al., "An Augmented Reality approach to factory layout design embedding operation simulation," International Journal on Interactive Design and Manufacturing (IJIDeM) (2019) 13:1061-1071, Apr. 24, 2019, 11 pages, https://doi.org/10.1007/s12008-019-00567-6.

Polap et al., "Obstacle Detection as a Safety Alert in Augmented Reality Models by the Use of Deep Learning Techniques," Institute of Mathematics, Silesian University of Technology, Kaszubska 23, 44-100 Gliwice, Poland, Dec. 4, 2017, 16 pages, http://www.mdpi.com/journal/sensors.

"IBM Maximo Application Suite," IBM, Printed Jun. 13, 2022, 11 pages, https://www.ibm.com/products/maximo.

"Acoustic monitoring and background noise in industrial environment," Electric Motor Engineering, E-Mobility Made by GROB, Jun. 13, 2022, 10 pages, https://www.electricmotorengineering.com/acoustic-monitoring and-background-noise-industrial-environment/.

"A new sensor uses sound to diagnose faults in industrial machinery," Phys Org, Mar. 10, 2014, 4 pages, https://phys.org/news/2014-03-sensor-faults-industrial-machinery.html.

\* cited by examiner

AUGMENTED NOTIFICATIONS FOR VIBRATIONS

BACKGROUND

The present disclosure relates to notifications, and more specifically, to generating augmented notifications related to vibrations.

Users may operate in various environments with other equipment or individuals. These users may perform various tasks or jobs that take concentration but may also need to be immediately aware of their surroundings. Sound and other vibrations are something that these users may want to know more information about regarding the surroundings.

SUMMARY

According to embodiments, disclosed are a method, system, and computer program product.

One or more environmental vibrations that originate from a vibration source are detected by a wearable display device ("WDD"). The WDD is worn by a user. The vibration source is located in an environment that is proximate to the WDD. An alert condition related to the vibration source is identified, based on the one or more environmental vibrations. An augmented notification for the WDD is generated in response to the alert condition. The augmented notification provided, by the WDD, to the user.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to notifications; more particular aspects relate to generating augmented notifications related to vibrations. While the present disclosure is not necessarily limited to such applications, various aspects of the disclosure may be appreciated through a discussion of various examples using this context.

In various environments where users frequent, there can be different types of sounds or other relevant vibrations from the surroundings. These vibrations and sounds can be generated because of movement of machines, physical activities in the surrounding, natural disasters, and/or the movement of other people or individuals. Vibration within a stationary machine can also generate sound. Some of the sounds are known to the user and some of the sounds are unknown. The generated sound can have various contextual sense, like activities are in progress, a problem with a machine, area of concern, etc.

In general, when any vibration or sound is generated from a vibration source, the vibration may be unknown or there may be a dangerous condition—for example, a worker on any industrial floor that performs tasks next to heavy machinery. Often, these users may respond or prefer to respond by changing a direction of their gaze towards the source of the sound or vibration. Unfortunately, there may be a practical problem in that users may be of different skill or experience levels, or various other user status. For example, a user may have a health condition like an inability to turn or pivot while keeping balance. In another example, a user may not have the vision capabilities to turn and see distant objects in the environment. In yet another example, a user may be able to turn, but only in one direction as they are awkwardly holding or carrying something at the time.

Sometimes other conditions may indicate a need to inform a user that may not work for all users. For example, a user may not be able to hear a safety chime or feel the change in vibration to determine a machine is now adjacent to them. These various conditions may lead to safety situations or may practically limit how users can, or can't, perform certain tasks. For example, a user may be very experienced at performing various assembly steps for construction of a building. The user may, however, not have the capability of perception of their surroundings to identify various machinery that start and stop operations at a work site. In another example, a user in a home with average hearing and senses may be performing cleaning in a room of the home. Simultaneously, a load of laundry may be running in a drier in a separate room. The user may not be able to detect or hear the nearly inaudible change vibrations that indicate the load of laundry has finished drying.

Augmented Notifications for Vibrations ("ANV") may alleviate the drawbacks to identifying and dealing with various sounds and vibrations in an environment. The ANV may facilitate a worker working around machinery and in other potentially dangerous conditions. The ANV may operate by detecting environmental vibrations of various vibration sources located in an environment. The detection may be performed by a wearable display device ("WDD") that is worn by a user. A WDD may include an augmented reality or virtual reality headset that is worn by a user while in the environment.

The ANV may be configured to identify alert conditions based on the environmental vibrations that are adjacent to the user wearing the WDD. Alert conditions may include a dangerous or sudden situation that is occurring in the environment, such as someone dropping a heavy item, a machine beginning or ceasing operation, a vibration caused by an object moving toward the user wearing the WDD, and other relevant conditions. Responsive to the alert condition, the ANV may generate an augmented notification. The augmented notification may be designed for the WDD worn by the user. Moreover, the ANV may provide the augmented notification to the to the WDD. In some embodiments, the ANV may be configured as part of a central computing system that communicates with one or more users that wear WDDs. In some embodiments, the ANV may be an integral part of a WDD that operates based on processing power in the WDD. The ANV may be useful to guide users as they react or will react to a particular noise, vibration, or sound in an environment.

The ANV may be beneficial to users that wear WDDs in various environments. Specifically, the ANV may operate by receiving a plurality of parameters that are, in this case, various other parameters from a WDD. For example, the ANV may receive loudness of sound with respect to a worker's position, the type of a generated sound, and the like. The ANV may also be configured to predict the change in gaze direction, eye movement, looking direction, or other relevant reactions of a wearer. For example, a worker may be wearing head mounted AR glasses in any industrial floor. The AR glasses may facilitate a worker to view the real world (e.g., the industrial floor) and overlaid digital content (e.g., an augmented interface). The industrial floor may also have different types of machines or industrial activities in the surrounding of the worker. These machines and industrial activities may be generating vibrations and sounds. The ANV can predict the view change of a worker in the industrial floor and can provide proactive contextual information. The predictions of reactions and vibrations can lead to safety benefits. For example, the ANV may operate to warn a wearer of a WDD to various alert conditions, such as falling debris, beginning or ending of heavy machine operations, raised or alerted yelling or voices of other users, and the like. Consequently, a wearer of a WDD that operates with the ANV may have increased reaction times, and experience relatively more safety while traversing in an environment.

Figure 1:
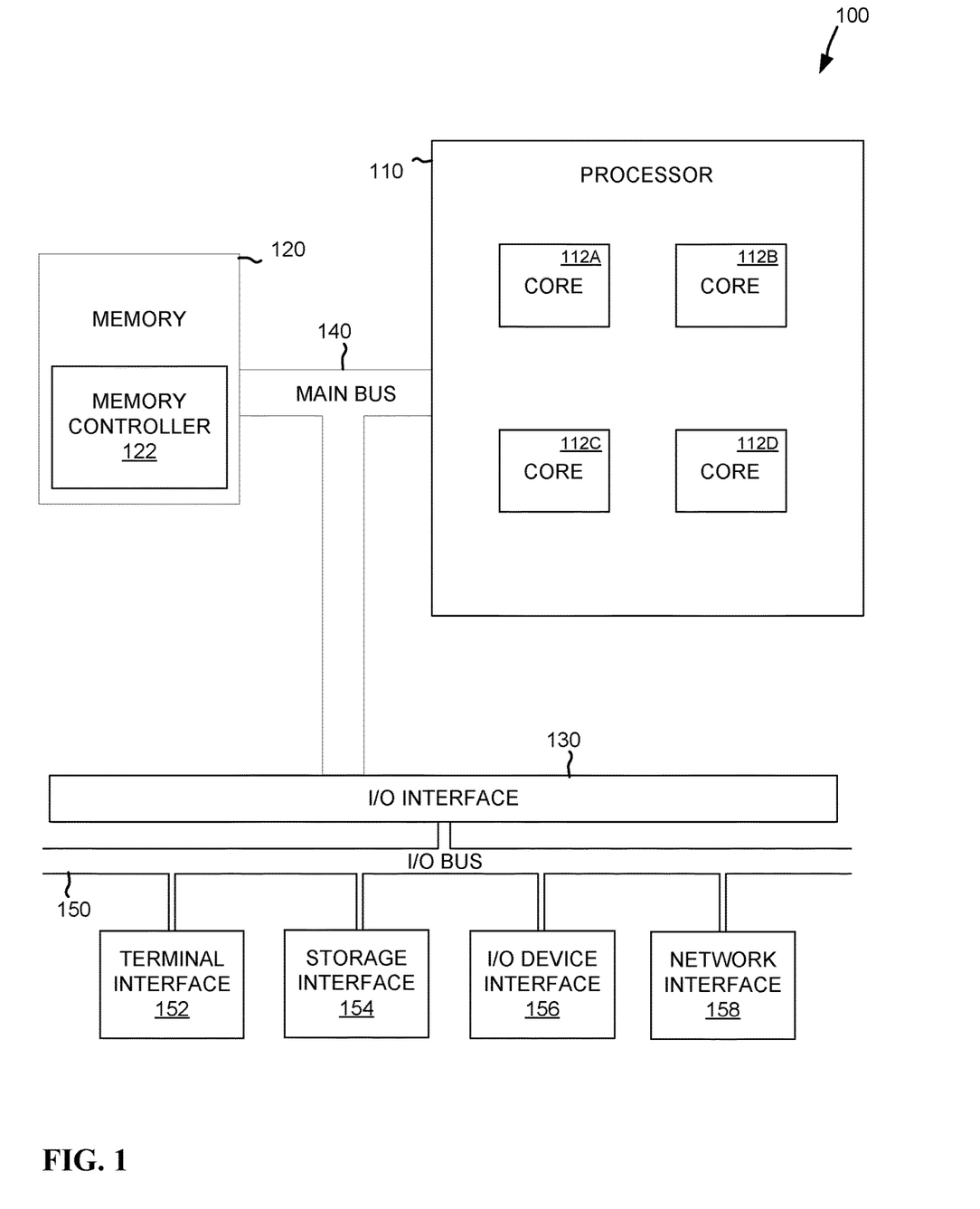
FIG. 1 depicts the representative major components of an example computer system that may be used, in accordance with some embodiments of the present disclosure.

FIG. 1 depicts the representative major components of an example computer system 100 (alternatively, computer) that may be used, in accordance with some embodiments of the present disclosure. It is appreciated that individual components may vary in complexity, number, type, and/or configuration. The particular examples disclosed are for example purposes only and are not necessarily the only such variations. The computer system 100 may include a processor 110, memory 120, an input/output interface (herein I/O or I/O interface) 130, and a main bus 140. The main bus 140 may provide communication pathways for the other components of the computer system 100. In some embodiments, the main bus 140 may connect to other components such as a specialized digital signal processor (not depicted).

The processor 110 of the computer system 100 may be comprised of one or more cores 112A, 112B, 112C, 112D (collectively 112). The processor 110 may additionally include one or more memory buffers or caches (not depicted) that provide temporary storage of instructions and data for the cores 112. The cores 112 may perform instructions on input provided from the caches or from the memory 120 and output the result to caches or the memory. The cores 112 may be comprised of one or more circuits configured to perform one or more methods consistent with embodiments of the present disclosure. In some embodiments, the computer system 100 may contain multiple processors 110. In some embodiments, the computer system 100 may be a single processor 110 with a singular core 112.

The memory 120 of the computer system 100 may include a memory controller 122. In some embodiments, the memory 120 may include a random-access semiconductor memory, storage device, or storage medium (either volatile or non-volatile) for storing data and programs. In some embodiments, the memory may be in the form of modules (e.g., dual in-line memory modules). The memory controller 122 may communicate with the processor 110, facilitating storage and retrieval of information in the memory 120. The memory controller 122 may communicate with the I/O interface 130, facilitating storage and retrieval of input or output in the memory 120.

The I/O interface 130 may include an I/O bus 150, a terminal interface 152, a storage interface 154, an I/O device interface 156, and a network interface 158. The I/O interface 130 may connect the main bus 140 to the I/O bus 150. The I/O interface 130 may direct instructions and data from the processor 110 and memory 120 to the various interfaces of the I/O bus 150. The I/O interface 130 may also direct instructions and data from the various interfaces of the I/O bus 150 to the processor 110 and memory 120. The various interfaces may include the terminal interface 152, the storage interface 154, the I/O device interface 156, and the network interface 158. In some embodiments, the various interfaces may include a subset of the aforementioned interfaces (e.g., an embedded computer system in an industrial application may not include the terminal interface 152 and the storage interface 154).

Logic modules throughout the computer system 100—including but not limited to the memory 120, the processor 110, and the I/O interface 130—may communicate failures and changes to one or more components to a hypervisor or operating system (not depicted). The hypervisor or the operating system may allocate the various resources available in the computer system 100 and track the location of data in memory 120 and of processes assigned to various cores 112. In embodiments that combine or rearrange elements, aspects and capabilities of the logic modules may be combined or redistributed. These variations would be apparent to one skilled in the art.

Figure 2:
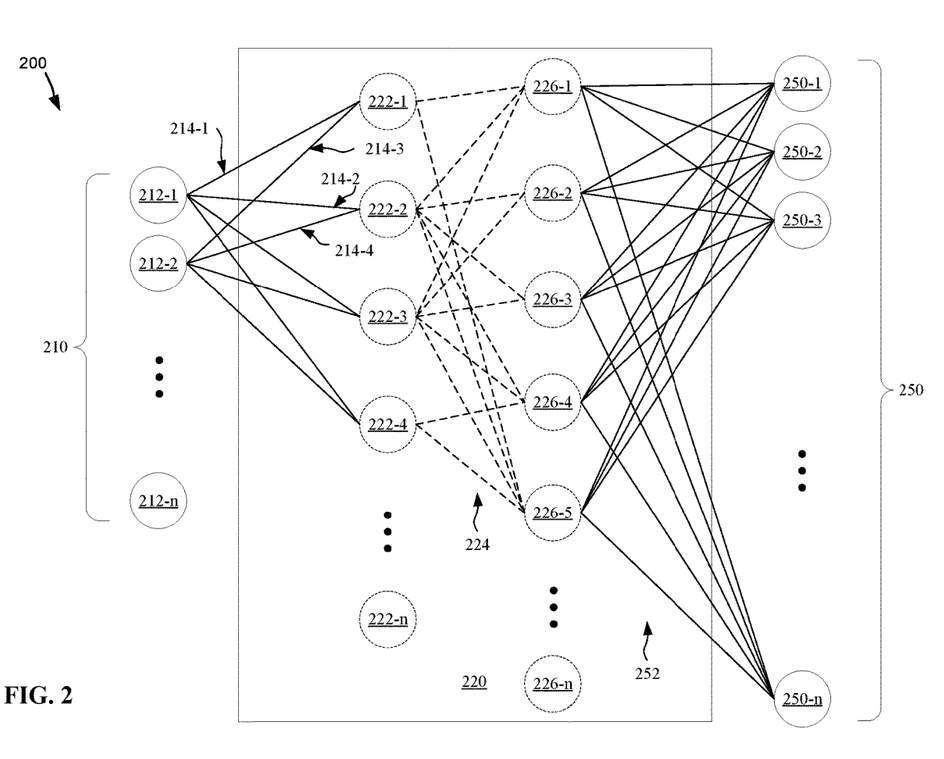
FIG. 2 depicts an example neural network representative of one or more artificial neural networks, consistent with some embodiments of the present disclosure.

FIG. 2 depicts an example neural network (alternatively, "network") 200 representative of one or more artificial neural networks, consistent with some embodiments of the present disclosure. The neural network 200 is made up of a plurality of layers. The network 200 includes an input layer 210, a hidden section 220, and an output layer 250. Though network 200 depicts a feed-forward neural network, it should be appreciated that other neural networks layouts may also be contemplated, such as a recurrent neural network layout (not depicted). In some embodiments, the network 200 may be a design-and-run neural network and the layout depicted may be created by a computer programmer. In some embodiments, the network 200 may be a design-by-run neural network, and the layout depicted may be generated by the input of data and by the process of analyzing that data according to one or more defined heuristics. The network 200 may operate in a forward propagation by receiving an input and outputting a result of the input. The network 200 may adjust the values of various components of the neural network by a backward propagation (back propagation).

The input layer 210 includes a series of input neurons 212-1, 212-2, up to 212-n (collectively, 212) and a series of input connections 214-1, 214-2, 214-3, 214-4, etc. (collectively, 214). The input layer 210 represents the input from data that the neural network is supposed to analyze data (e.g., images, sounds, text, hardware sensor information). Each input neuron 212 may represent a subset of the input data.

For example, input neuron 212-1 may be the first pixel of a picture, input neuron 212-2 may be the second pixel of the picture, etc. The number of input neurons 212 may correspond to the size of the input. For example, when neural network 200 is designed to analyze images that are 256 pixels by 256 pixels, the neural network layout may include a series of 65,536 input neurons. The number of input neurons 212 may correspond to the type of input. For example, when the input is a color image that is 256 pixels by 256 pixels, the neural network layout may include a series of 196,608 input neurons (65,536 input neurons for the red values of each pixel, 65,536 input neurons for the green values of each pixel, and 65,536 input neurons for the blue values of each pixel). The type of input neurons 212 may correspond to the type of input. In a first example, a neural network may be designed to analyze images that are black and white, and each of the input neurons may be a decimal value between 0.00001 and 1 representing the grayscale shades of the pixel (where 0.00001 represents a pixel that is completely white and where 1 represents a pixel that is completely black).

In a second example, a neural network may be designed to analyze images that are color, and each of the input neurons may be a three-dimensional vector to represent the color values of a given pixel of the input images (where the first component of the vector is a red whole-number value between 0 and 255, the second component of the vector is a green whole-number value between 0 and 255, and the third component of the vector is a blue whole-number value between 0 and 255).

The input connections 214 represent the output of the input neurons 212 to the hidden section 220. Each of the input connections 214 varies depending on the value of each input neuron 212 and based upon a plurality of weights (not depicted). For example, the first input connection 214-1 has a value that is provided to the hidden section 220 based on the input neuron 212-1 and a first weight. Continuing the example, the second input connection 214-2 has a value that is provided to the hidden section 220 based on the input neuron 212-1 and a second weight. Further continuing the example, the third input connection 214-3 based on the input neuron 212-2 and a third weight, etc. Alternatively stated, the input connections 214-1 and 214-2 share the same output component of input neuron 212-1 and the input connections 214-3 and 214-4 share the same output component of input neuron 212-2; all four input connections 214-1, 214-2, 214-3, and 214-4 may have output components of four different weights. Though the network neural 200 may have different weightings for each connection 214, some embodiments may contemplate weights that are similar. In some embodiments, each of the values of the input neurons 212 and the connections 214 may necessarily be stored in memory.

The hidden section 220 includes one or more layers that receive inputs and produce outputs. The hidden section 220 includes a first hidden layer of calculation neurons 222-1, 222-2, 222-3, 222-4, up to 222-n (collectively, 222); a second hidden layer of calculation neurons 226-1, 226-2, 226-3, 226-4, 226-5, up to 226-n (collectively 226); and a series of hidden connections 224 coupling the first hidden layer and the second hidden layer. It should be appreciated that neural network 200 only depicts one of many neural networks capable of performing ML operations consistent with some embodiments of the disclosure. Consequently, the hidden section 220 may be configured with more or less hidden layers (e.g., one hidden layer, seven hidden layers, twelve hidden layers, etc.)—two hidden layers are depicted for example purposes.

The first hidden layer includes the calculation neurons 222-1, 222-2, 222-3, 222-4, up to 222-n. Each calculation neuron of the first hidden layer may receive as input one or more of the connections 214. For example, calculation neuron 222-1 receives input connection 214-1 and input connection 214-2. Each calculation neuron of the first hidden layer also provides an output. The output is represented by the dotted lines of hidden connections 224 flowing out of the first hidden. Each of the calculation neurons 222 performs an activation function during forward propagation. In some embodiments, the activation function may be a process of receiving several binary inputs, and calculating a single binary output (e.g., a perceptron). In some embodiments, the activation function may be a process of receiving several non-binary inputs (e.g., a number between 0 and 1, 0.671, etc.) and calculating a single non-binary output (e.g., a number between 0 and 1, a number between −0.5 and 0.5, etc.). Various functions may be performed to calculate the activation function (e.g., a sigmoid neurons or other logistic functions, tanh neurons, softplus functions, softmax functions, rectified linear units, etc.). In some embodiments, each of the calculation neurons 222 also contains a bias (not depicted). The bias may be used to decide the likelihood or valuation of a given activation function. In some embodiments, each of the values of the biases for each of the calculation neurons must necessarily be stored in memory.

The neural network 200 may include the use of a sigmoid neuron for the activation function of calculation neuron 222-1. An equation (Equation 1, stated below) may represent the activation function of calculation neuron 212-1 as f(neuron). The logic of calculation neuron 222-1 may be the summation of each of the input connections that feed into calculation neuron 222-1 (i.e., input connection 214-1 and input connection 214-3) which are represented in Equation 1 as j. For each j the weight w is multiplied by the value x of the given connected input neuron 212. The bias of the calculation neuron 222-1 is represented as b. Once each input connection j is summed the bias b is subtracted. Finalizing the operations of this example as follows: given a larger positive number of results from the summation and bias in activation f(neuron), the output of calculation neuron 222-1 approaches approximately 1; given a larger negative number of results from the summation and bias in activation f(neuron), the output of calculation neuron 222-1 approaches approximately 0; and given a number somewhere in between a larger positive number and a larger negative number of results from the summation and bias in activation f(neuron), the output varies slightly as the weights and biases vary slightly.

$$f(\text{neuron}) = \frac{1}{1 + \exp\left(-\sum_j w_j x_j - b\right)} \quad \text{Equation 1}$$

The second hidden layer includes the calculation neurons 226-1, 226-2, 226-3, 226-4, 226-5, up to 226-n. In some embodiments, the calculation neurons 226 of the second hidden layer may operate similarly to the calculation neurons 222 first hidden layer. For example, the calculation neurons 226-1 to 226-n may each operate with a similar activation function as the calculation neurons 222-1 to 222-n. In some embodiments, the calculation neurons 226 of the second hidden layer may operate differently to the calculation neurons 222 of the first hidden layer. For example, the calculation neurons 226-1 to 226-n may have a first activation function, and the calculation neurons 222-1 to 222-n may have a second activation function.

Similarly, the connectivity to, from, and between the various layers of the hidden section 220 may also vary. For example, the input connections 214 may be fully connected to the first hidden layer and hidden connections 224 may be fully connected from the first hidden layer to the second hidden layer 226. In some embodiments, fully connected may mean that each neuron of a given layer may be connected to all the neurons of a previous layer. In some embodiments, fully connected may mean that each neuron of a given layer may function completely independently and may not share any connections. In a second example, the input connections 214 may not be fully connected to the first hidden layer and the hidden connections 224 may not be fully connected from the first hidden layer to the second hidden layer 226.

Further, the parameters to, from, and between the various layers of the hidden section 220 may also vary. In some embodiments, the parameters may include the weights and the biases. In some embodiments, there may be more or less parameters than the weights and biases. For purposes of example, neural network 200 may be in the form of a convolutional neural network or convolution network. The convolutional neural network may include a sequence of heterogeneous layers (e.g., an input layer 210, a convolution layer 222, a pooling layer 226, and an output layer 250). In such a network, the input layer may hold the raw pixel data of an image in a 3-dimensional volume of width, height, and color. The convolutional layer of such a network may output from connections that are only local to the input layer to identify a feature in a small section of the image (e.g., an eyebrow from a face of a first subject in a picture depicting four subjects, a front fender of a vehicle in a picture depicting a truck, etc.). Given this example, the convolutional layer may include weights and biases and additional parameters (e.g., depth, stride, and padding). The pooling layers of such a network may take as input the output of the convolutional layers but perform a fixed function operation (e.g., an operation that does not consider any weight or bias). Also given this example, the pooling layer may not contain any convolutional parameters and may also not contain any weights or biases (e.g., performing a down-sampling operation).

The output layer 250 includes a series of output neurons 250-1, 250-2, 250-3, up-to 250-n (collectively, 250). The output layer 250 holds a result of the analyzation of the neural network 200. In some embodiments, the output layer 250 may be a categorization layer used to identify a feature of the input to the network 200. For example, the network 200 may be a classification network trained to identify Arabic numerals. In such an example, the network 200 may include ten output neurons 250 corresponding to which Arabic numeral the network has identified (e.g., output neuron 250-2 having a higher activation value than output neurons 250 may indicate the neural network determined an image contained the number '1'). In some embodiments, the output layer 250 may be a real-value target (e.g., trying to predict a result when an input is a previous set of results) and there may be only a singular output neuron (not depicted). The output layer 250 is fed from an output connection 252. The output connection 252 provides the activations from the hidden section 220. In some embodiments, the output connections 252 may include weights and the output neurons 250 may include biases.

Training the neural network depicted by neural network 200 may include performing back propagation. Back propagation is different from forward propagation. Forward propagation may include feeding of data into the input neurons 210; performing the calculations of the connections 214, 224, 252; and performing the calculations of the calculation neurons 222 and 226. The forward propagation may also be the layout of a given neural network (e.g., recurrence, number of layers, number of neurons in one or more layers, layers being fully connected or not to other layers, etc.). Back propagation may be used to determine an error of the parameters (e.g., the weights and the biases) in the network 200 by starting with the output neurons 250 and propagating the error backward through the various connections 252, 224, 214 and layers 226, 222, respectively.

Back propagation includes performing one or more algorithms based on one or more training data to reduce the difference between what a given neural network determines from an input and what the given neural network should determine from the input. The difference between a network determination and the correct determination may be called the objective function (alternatively, the cost function). When a given neural network is initially created and data is provided and calculated through a forward propagation the result or determination may be an incorrect determination.

For example, neural network 200 may be a classification network; may be provided with a 128 pixel by 250-pixel image input that contains the number '3'; and may determine that the number is most likely '9' and is second most likely '2' and is third most likely '3' (and so on with the other Arabic numerals). Continuing the example, performing a back propagation may alter the values of the weights of connections 214, 224, and 252; and may alter the values of the biases of the first layer of calculation neurons 222, the second layer of calculation neurons 226, and the output neurons 250. Further continuing the example, the performance of the back propagation may yield a future result that is a more accurate classification of the same 128 pixel by 250-pixel image input that contains the number '3' (e.g., more closely ranking '9', '2', then '3' in order of most likely to least likely, ranking '9', then '3', then '2' in order of most likely to least likely, ranking '3' the most likely number, etc.).

Equation 2 provides an example of the objective function ("example function") in the form of a quadratic cost function (e.g., mean squared error)—other functions may be selected, and the mean squared error is selected for example purposes. In Equation 2, all of the weights may be represented by w and biases may be represented by b of neural network 200. The network 200 is provided a given number of training inputs n in a subset (or entirety) of training data that have input values x. The network 200 may yield output a from x and should yield a desired output y(x) from x. Back propagation or training of the network 200 should be a reduction or minimization of the objective function 'O(w,b)' via alteration of the set of weights and biases. Successful training of network 200 should not only include the reduction of the difference between the answer a and the correct answers y(x) for the input values x, but given new input values (e.g., from additional training data, from validation data, etc.).

$$O(w, b) \equiv \frac{1}{2n} \sum_{x} \|y(x) - a\|^2 \quad \text{Equation 2}$$

Many options may be utilized for back propagation algorithms in both the objective function (e.g., mean squared error, cross-entropy cost function, accuracy functions, confusion matrix, precision-recall curve, mean absolute error, etc.) and the reduction of the objective function (e.g., gradient descent, batch-based stochastic gradient descent, Hessian optimization, momentum-based gradient descent, etc.). Back propagation may include using a gradient descent algorithm (e.g., computing partial derivatives of an objective function in relation to the weights and biases for all of the training data). Back propagation may include determining a stochastic gradient descent (e.g., computing partial derivatives of a subset the training inputs in a subset or batch of training data). Additional parameters may be involved in the various back propagation algorithms (e.g., the learning rate for the gradient descent). Large alterations of the weights and biases through back propagation may lead to incorrect training (e.g., overfitting to the training data, reducing towards a local minimum, reducing excessively past a global minimum, etc.). Consequently, modification to objective functions with more parameters may be used to prevent incorrect training (e.g., utilizing objective functions that incorporate regularization to prevent overfitting). Also, consequently, the alteration of the neural network 200 may be small in any given iteration. Back propagation algorithms may need to be repeated for many iterations to perform accurate learning as a result of the necessitated smallness of any given iteration.

For example, neural network 200 may have untrained weights and biases, and back propagation may involve the stochastic gradient descent to train the network over a subset of training inputs (e.g., a batch of 10 training inputs from the entirety of the training inputs). Continuing the example, network 200 may continue to be trained with a second subset of training inputs (e.g., a second batch of 10 training input from the entirety other than the first batch), which can be repeated until all of the training inputs have been used to calculate the gradient descent (e.g., one epoch of training data). Stated alternatively, if there are 10,000 training images in total, and one iteration of training uses a batch size of 100 training inputs, 1,000 iterations would be needed to complete an epoch of the training data. Many epochs may be performed to continue training of a neural network. There may be many factors that determine the selection of the additional parameters (e.g., larger batch sizes may cause improper training, smaller batch sizes may take too many training iterations, larger batch sizes may not fit into memory, smaller batch sizes may not take advantage of discrete GPU hardware efficiently, too little training epochs may not yield a fully trained network, too many training epochs may yield overfitting in a trained network, etc.).

Further, network 200 may be evaluated to quantify the performance of evaluating a dataset, such as by use of an evaluation metric (e.g., mean squared error, cross-entropy cost function, accuracy functions, confusion matrix, precision-recall curve, mean absolute error, etc.).

Figure 3A:
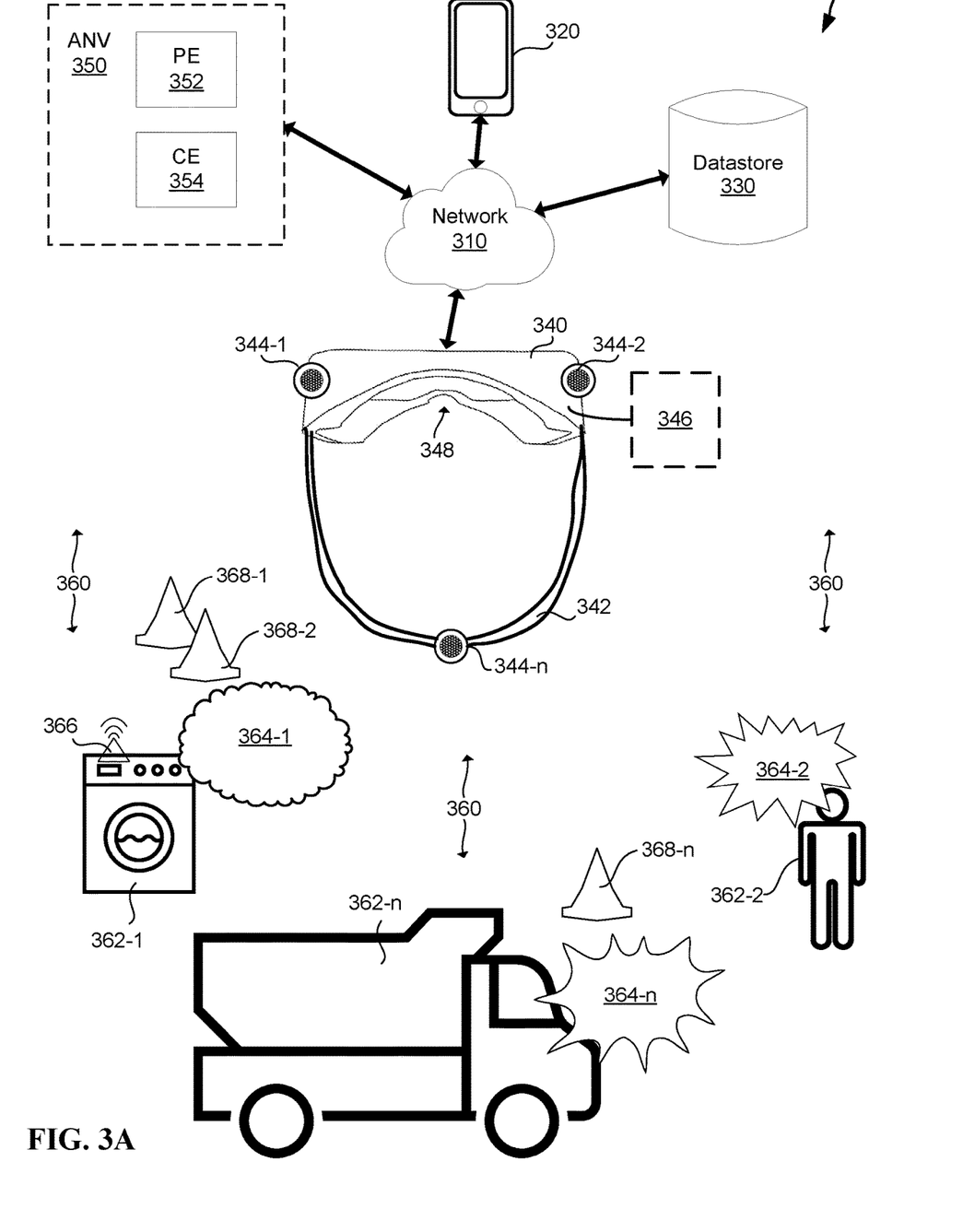
FIG. 3A depicts an example system configured to notify users, consistent with some embodiments of the disclosure.

FIG. 3A depicts an example system 300 configured to notify users, consistent with some embodiments of the disclosure. System 300 may operate to benefit a user (not depicted) that wears a head-mounted or other wearable display device (e.g., a wearer). System 300 may include one or more of the following: a network 310 to facilitate communication; at least one paired client device 320; a datastore 330; a wearable display device ("WDD") 340; and an ANV 350. System 300 may be configured to notify a user based on where they are contemporaneously. For example, as a wearer exists or traverses in environment 360, one or more augmented notifications may be generated and provided to notify the wearer.

Network 310 can be implemented using any number of any suitable physical and/or logical communications topologies. The network 310 can include one or more private or public computing networks. For example, network 310 may comprise a private network (e.g., a network with a firewall that blocks non-authorized external access) that is associated with a particular function or workload (e.g., communication, streaming, hosting, sharing), or set of software or hardware clients. Alternatively, or additionally, network 310 may comprise a public network, such as the Internet. Consequently, network 310 may form part of a data unit network (e.g., packet-based)—for instance, a local-area network, a wide-area network, and/or a global network.

Network 310 can include one or more servers, networks, or databases, and can use one or more communication protocols to transfer data between other components of system 300. Furthermore, although illustrated in FIG. 3 as a single entity, in other examples network 310 may comprise a plurality of networks, such as a combination of public and/or private networks. The communications network 310 can include a variety of types of physical communication channels or "links." The links can be wired, wireless, optical, and/or any other suitable media. In addition, the communications network 310 can include a variety of network hardware and software (not depicted) for performing routing, switching, and other functions, such as routers, switches, base stations, bridges or any other equipment that may be useful to facilitate communicating data.

In some embodiments, system 300 may include at least one client device 320. The client device 320 may be a computing device that comprises a process, memory, and I/O, such as an instance of computer system 100. The client device 320 may be configured to communicate with one or more of the other components of system 300, such as through network 310. The client device 320 may also have differing computing resources as other components of system 300. As a result of the computing resources, the client device 320 may be more or less likely to host and process the augmented notifications for system 300. For example, client device 320 may have double or triple the processing, memory, and or power-source capabilities of WDD 340. As a result of the relatively larger amounts of computing resources, client device 320 may process sounds in the environment 360 and may generate notifications before they are provided to the wearer by the WDD 340. In some embodiments, system 300 may not include any client devices. for example, system 300 may include a WDD 340 configured to generate augmented notifications without client device 320 or any other computer system.

Datastore 330 of system 300 may be a data structure that is configured to hold information related to system 300. Datastore 330 may be embodied as a database, filesystem, key-value pair, or other relevant logical computing structure. Datastore 300 may be embodied as a server, cluster of servers, abstracted system, or other relevant physical computing structure.

Datastore 330 may include a profile datastore that is configured to store information and preferences related to users that wear WDDs and receive notifications (e.g., a wearer of the WDD 340). The profile datastore store one or more user parameters regarding the wearer or other wearers. The user parameters may include a health status or any other relevant information about the health of the user. For example, the profile datastore may include data that includes any vision capabilities or impairments that affects the ability of a user to or not to see. In another example, the profile datastore may include any balance data that includes whether a user has an internal ear condition, or another condition that affects the ability of a user to or not to balance. In another example, the profile datastore may include other body information, that describes whether a user can or cannot stand, turn, look, or otherwise move. The system 300 may be configured to prompt a wearer of the WDD or other users for permission to store any personal data (e.g., health related data) in the datastore 330, or to collect any information related to a user for processing.

Datastore 330 may include a historical datastore that contains historical information. The historical datastore may include information about previous actions and activities of a user (e.g., a wearer of WDD 340), such as how often a user does or does not stand, crouch, or move. The historical datastore may include information about reactions to previous sounds and vibrations a user may experience. For example, the historical datastore may include how frequently or how infrequently a wearer of WDD 340 turns to look or gaze at a particular sound or vibration. In another example, the historical database may include how quickly or slowly a wearer of WDD 340 reacts in time to a particular sound or vibration. In yet another example, the historical datastore may include gaze changes such as the direction and speed of eye-movement or gaze changes of a wearer of WDD 340—or if a wearer of WDD 340 does or does not change their gaze. In yet still another example, the historical datastore may include whether a wearer of WDD 340 does or does not react to a particular sound. The historical datastore may include information about previous actions and activities of a WDD, such as WDD 340. For example, the historical datastore may include changes in position, rotation, or other relevant orientation or relative position changes of WDD 340 within various environments, such as environment 360.

WDD 340 of system 300 may be a client device configured to provide visual notifications to a wearer. WDD 340 may be configured as a computing device, such as an instance of computer system 100. WDD 340 may include one or more of the following: an attachment means 342; a plurality of environmental sensors 344-1, 344-2, up 344-n (collectively, environmental sensors 344); a plurality of internal components 346; and a display 348.

The attachment means 342 may include a strap, band, stems, clips, tabs, or other relevant physical components shaped and extending away from the WDD 340 to facilitate wearing by a wearer. The environmental sensors 344 may include sensors configured to detect one or more sounds and/or vibrations that occur adjacent to, around, proximate, or otherwise in the area of the WDD 340. For example, the environmental sensors 344 may include sensors that are configured to capture the vibrations, such as audio transceivers and piezoelectric accelerometers.

The environmental sensors 344 may be configured to capture vibrations, such as those made by objects that are rolling, walking, moving, oscillating, shaking, and the like in environment 360. The environmental sensors 344 may be configured to capture sounds, such as those made by humans, animals, machines, and the like in the environment 360. The placement or location of the environmental sensors 344 may better facilitate locating the vibrations and/or sounds in an environment. For example, environmental sensors 344 may be located around the various outside positions or exterior surface of the WDD 340. The environmental sensors 344 may be attached or coupled to the attachment means 342. For example, one or more environmental sensors 344 may be affixed at various positions on the attachment means 342.

The internal components 346 may include various components to facilitate operation of the WDD 340. For example, the internal components 346 may include processing circuits (not depicted) that facilitate the operation of processing data that is received from the environment 360. Specifically, the processing circuits may be an instance of a computer, such as computer system 100. The processing circuits may run or execute one or more routines or other software configured to receive environmental information and to provide notifications to a wearer. In another example, the internal components 346 may include a network transceiver (not depicted) configured to send and receive data through network 310 to other components of system 300.

The internal components 346 may also include components to detect the movement, relative position, orientation, and other relevant data regarding the gaze, look, and pose of the wearer of the WDD 340. For example, the internal components 346 may include a global position sensor ("GPS"), an altimeter, a compass, gyroscopes, and other relevant position/movement/orientation sensors. The WDD 340 may operate by communicating with the client device 320 to determine the position/movement/orientation of the wearer. For example, the internal components 346 may include an ultra-wideband sensor configured to communicate and determine in near real-time relative position with respect to client device 320 or other computer systems in environment 360.

The display 348 may be a virtual reality display that is configured to generate an entire virtual environment for navigation and comprehension of a wearer. The display 348 may be an augmented reality or mixed reality display that is configured to generate virtual elements to augment navigation and comprehension of a wearer.

ANV 350 of system 300 may be a collection of hardware and/or software that is configured to provide augmented notifications to a wearer of the WDD 340. ANV 350 may operate as a part of one or the components of system 300. For example, ANV 350 may operate as a part of client device 320. In another example ANV 350 may operate as software in the processing circuits of WDD 340. In yet another example, ANV 350 may operate on a separate computer, such as an instance of computer system 300 that communicates through network 310. ANV 350 may include one or more general purpose or special purpose circuits that are configured to execute various routines or programs. ANV 350 may include one or more jobs, daemons, routines, programs, or other relevant software constructions. The routines may comprise steps to detect environmental vibrations; identify alert conditions based on the environmental vibrations; generate an augmented notification in response to the alert condition; and provide the augmented notification to WDD 340. ANV 350 may also include a prediction engine ("PE") 352 configured to perform predictions. For example, PE 352 may operate as an instance of neural network 200 that is trained on data from prior noises, sounds, and vibrations—as well as—prior reactions, movements, and gazes of wearers. The training of PE 352 may be specific to a particular environment, such as environment 360.

Further discussion of ANV 350 and system 300 generally may be discussed with respect to environment 360 and an example usage scenario. Other environments, such as homes, residences, education environments, crowds, outdoor parks, indoor museums, and the like are contemplated for ANV 350. Environment 360 is described for example purposes. Environment 360 may include one or more elements 362-1, 362-2 up to 362-$n$ (collectively, elements 362). One or more of the elements 362 may be Internet of Things ("IoT") devices. For example, element 362-1 may be an industrial machine that includes a network antenna 366 that is configured to wirelessly communicate with other computing devices. The environment 360 may also include other obstacles 368-1, 368-2, up to 368-$n$ (collectively, obstacles 368). The obstacles 368 may represent street signs, walls, trees, rocks, or other objects that are located in the environment 360.

Each element 362 may be considered a vibration source. Specifically, each element 362 may make one or more vibrations 364-1, 364-2, up to 364-$n$, in the environment 360 (collectively, environmental vibrations 364). The vibrations 364 may be inaudible, such as vibrations that are outside of the spectrum of hearing of an individual. For example, vibration 364-1 may be a low frequency rumble or hum of a cement mixer or industrial device that users in environment 360 may not be able to hear but may be able to feel. The vibrations 364 may be audible, such as vibrations that are within the spectrum of hearing of an individual. For example, vibration 364-$n$ may be an audible honking or beeping emanating from a vehicle that users in environment 360 may be able to hear.

The ANV 350 may further operate by determining the relative position of the vibration source and/or the wearer with respect to the environment 360. Specifically, the ANV 350 may be configured to identify, the relative distance and direction of the generated vibrations from the elements 362 and/or sounds in the surrounding with respect to the wearer of the WDD 340. Specifically, the ANV 350 may utilize a plurality of sensor readings (e.g., from the environmental sensors 344), captured from the WDD 340. The ANV 350 may triangulate, time-of-flight measurement, and comparison, or another relevant technique for further pinpointing or locating of a particular vibration source. Moreover, the ANV 350 may be configured to determine the relative position and/or gaze of the wearer of the WDD 340. Specifically, the environmental sensors 344 and the internal components 346 may measure the environment 360 and the wearer of the WDD 340. The ANV 350 may utilize the measurements of the WDD 340 to determine the positions of elements 362 and obstacles 368 in the surrounding or vicinity of the environment 360. The ANV 350 may also identify the relative position of the wearer of the WDD 340 in the environment 360. The ANV 350 may capture IoT feeds, such as from antenna 366 of element 362-1 in the environment 360. The ANV 350 may correlate the IoT feed with the vibrations 364-1 of element 362-1.

Based on the various measurements and based on information stored in the datastore 330, the ANV 350 may make determinations related to the vibrations 364. For example, the ANV 350 may use IoT feeds, such as from element 362-1, to identify the vibration source of vibrations, such as vibrations 364-1 in environment 360. In a second example, the ANV 350 may identify the current position, rotation, and/or gaze of the wearer of the WDD 340. In a third example, the ANV 350 may identify the ability of the wearer of the WDD 340 to (or not to) look, rotate, and/or change their gaze, to react to the vibration sources in the environment 360. In a fourth example, the ANV 350 may identify the relative distance and position as it relates to the WDD 340 and a given element 362.

Based on the various measurements and based on information stored in the datastore 330, the ANV 350 may identify a wearer's level of comfort to turn in a direction, like clockwise, anticlockwise, etc., with respect to an activity. For example, based on input data from the WDD 340, the ANV 350 may determine that the wearer of the WDD is on a ladder. The ANV 350 may make the determination that a user may not be able to comfortably adjust their gaze based on being on the ladder. In another example, the ANV 350 may receive input that is visual, regarding the environment 360, such as the position and location of the various obstacles 368. Further the ANV 350 may identify if obstacles 368 are in a line of sight of the wearer of the WDD 340. Based on the identification, the ANV 350 may identify a shortest eye gaze movement path so that the wearer of the WDD 340 may change the eye gaze and pinpoint a particular vibration 364 made by a particular element 362.

The ANV 350 may also make one or more predictions. Specifically, the PE 352 of the ANV 350 may execute one or more algorithms to make various predictions. The PE 352 may operate as a machine learning technique, such as an instance of neural network 200. A prediction of the PE 352 may analyze the IoT feeds from machines, such as element 362-1, and receive communications regarding various activities. For example, ANV 350 may receive information, via an IoT feed, from element 362-1 that is indicative of a machine that is beginning to start an industrial cycle (e.g., crushing rocks). The PE 352 may predict that vibration 364-1 may begin relatively soon (e.g., in thirty seconds, in three minutes). The PE 352 may provide the prediction to the ANV 350, so the ANV 350 can generate an augmented notification regarding the beginning of the vibration before the vibration occurs.

A prediction of the PE 352 may be how a particular sound reaches a wearer of the WDD 340 based on the environment 360. For example, the PE 352 may capture the generated vibrations 364-$n$ in the environment 360. The PE 352 may make a prediction of how the sound travels to the wearer of the WDD 340, such as how the path of vibration 364-$n$ is affected by the obstacles 368-$n$. Further details may be provided regarding the environment 360 in making predictions. For example, sound a material information may be provided to the ANV 350, such as properties of vibrations, and sound propagating media like air, metallic structures, etc.

A prediction of the PE 352 may be of future vibrations. Specifically, the PE 352 may utilize historical data from the datastore 330 and perform historical learning to identify future vibrations from past vibrations. The ANV 350 and/or PE 352 may utilize historical learning to identify if any vibration is about to be generated in the environment 360. For example, the WDD 340 captures past or historical data about the vibrations 364. The historical data may include the volume, frequency, location, position, duration, and how frequently (e.g., how often) various vibrations 364 may occur. The capture of the historical data may be from the client device 320 or from other computing devices (e.g., other WDDs (not depicted) on prior days or weeks in environment 360). The PE 352 and/or the ANV 350 may perform learning from the historical data to identify the next occurrence of a particular vibration 364.

A prediction of the PE 352 may be of when a user may react to a particular vibration. Specifically, the PE 352 may utilize historical data from the datastore 330 and the performance of historical learning on the historical data to predict future reactions. For example, if a wearer of the WDD 340 consistently turns to the right based on past vibrations that are consistent with vibration 364-1, the PE 352 may inform the ANV 350 regarding a predicted reaction of the wearer to vibration 364-1. The ANV 350 may also provide to the PE 352 various input about a current gaze of the user, such as based on the internal components 346 from the WDD 340. The PE 352 may compare the current action (current gaze, orientation, position), based on the internal component 346, to historical data of previous gazes, and may consequently predict a future reaction of a user. Further, based on historically captured data about the change in eye gaze, the ANV 350 may be tracking the vibrations 364 in the environment 360. The prediction may also be based on a combination of other factors, including: generated vibrations 364, future vibrations, a relative distance and direction of vibrations, etc.

Figure 3B:
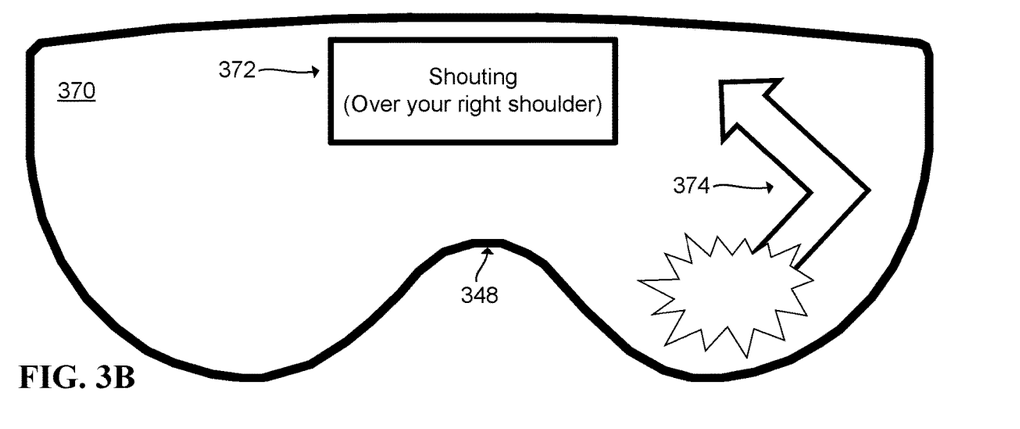
FIG. 3B depicts a first example augmented interface of a wearable display device, consistent with some embodiments of the disclosure.
Figure 3C:
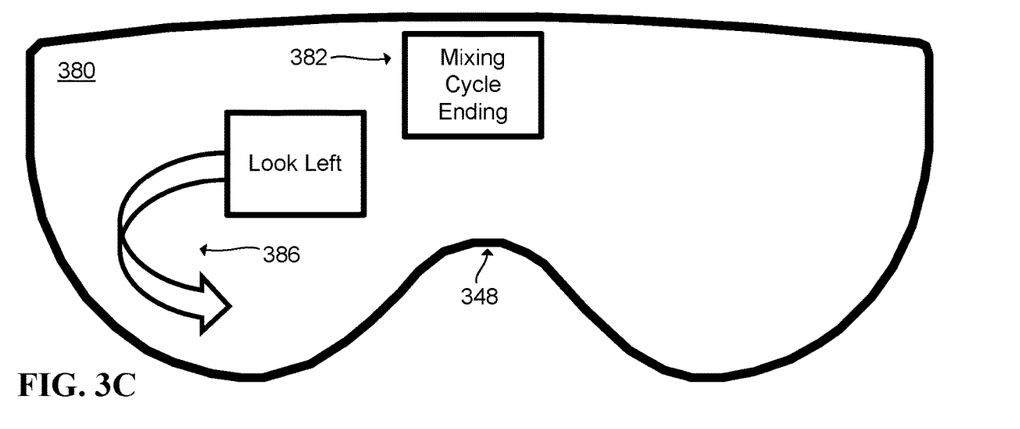
FIG. 3C depicts a second example augmented interface of a wearer of a wearable display device, consistent with some embodiments of the disclosure.
Figure 3D:
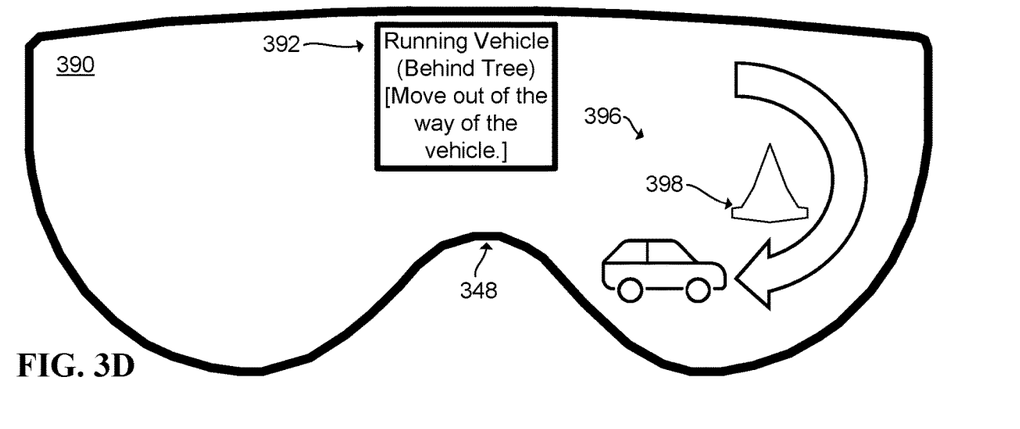
FIG. 3D depicts a third example augmented interface of a wearer of a wearable display device, consistent with some embodiments of the disclosure.

FIGS. 3B, 3C, and 3D depict additional portions of system 300. In particular, FIGS. 3B and 3C depict display 348 of WDD 340 that may be configured to show one or more real-world objects ("not depicted") of environment 360, during various operating scenarios. For example, WDD 340 may operate as an augmented reality device that shows the environment 360 in addition to an augmented viewpoint (with computer generated information) (e.g., a computer-generated interface). The ANV 350 may personalize how a user is notified through display 348. The ANV 350 may consider previous experience and actions of a wearer of the WDD 340. The ANV 350 may also predict sounds, and/or that the wearer will be changing eye gaze in a personalized manner, and accordingly predict when the wearer may change eye gaze in a personalized manner. For example, a first user may be notified only as to the sounds of people that are in a given environment. In another example, a second user may be notified only as to the sounds and vibrations of heavy machinery. In yet still another example, a third user may be notified only as to sounds that are relatively near the third user (e.g., vibrations of objects within a few feet of a user, sounds of objects that could be near the user in a minute or less). In yet even still another example, a fourth user may be notified about future vibrations, including a relative distance and direction of vibrations, in the surrounding.

FIG. 3B depicts a first example augmented interface 370 of a wearable display device ("WDD") 340, consistent with some embodiments of the disclosure. The first example augmented interface 370 is of the environment 360 that includes that plurality of elements 362, obstacles 368, and other objects. The first example augmented interface 370 may include one or more augmented notifications that are provided by the display 348 to a wearer of the WDD 340. The first example augmented interface 370 may include the following: one or more textual notifications 372; and, one or more vibration source notifications 374.

The augmented notifications of augmented interface 370 may describe the environment 360. In detail, in response to vibrations 364-2 of element 362-2, the ANV 350 may generate textual notifications 372. The textual notifications 372 may describe the type or kind of vibrations 364-2 and/or vibration sources, e.g., element 362-2 is a user shouting for help. The textual notifications 372 may describe the relative position or orientation with respect of the WDD 340 to the vibrations 364-2, e.g., the words "over your right shoulder" describe the location of element 362-2.

Further, in response to vibrations 364-2 of element 362-2, the ANV 350 may generate the vibration source notifications 374. The vibration source notifications 374, may depict visually the vibrations 364-2 and the path, using visual information, e.g., using arrows and/or other visual indicators. The vibration source notifications 374, may indicate the relative location of the vibrations 364-2, e.g., behind the wearer of the WDD 340 on the right side. The vibration source notifications 374, may indicate the path of the vibrations 364-2, e.g., the shouting of the user echoes off of other objects and obstacles as it emanates towards the wearer.

FIG. 3C depicts a second example augmented interface 380 of a wearer of a WDD 340, consistent with some embodiments of the disclosure. The second example augmented interface 380 is of the environment 360 that includes that plurality of elements 362, obstacles 368, and other objects. The second example augmented interface 380 may include one or more augmented notifications that are provided by the display 348 to a wearer of the WDD 340. The second example augmented interface 380 may include the following: one or more textual notifications 382; and, one or more gaze adjustment notifications 386. The augmented interface 380 may be based on historical learning to proactively notify a wearer of WDD 340. For example, based on historical learning by PE 352, augmented interface 380 may proactively notify a user about the generation of vibrations from the predicted source location.

The augmented notifications of augmented interface 380 may describe the environment 360. In detail, in response to vibrations 364-1 of element 362-1, the ANV 350 may generate textual notifications 382. The textual notifications 382 may describe the type or kind of vibrations 364-1 and/or vibration sources; e.g., element 362-1 is a mixer that is finishing or about to finish a mix of concrete.

Further, in response to vibrations 364-1 of element 362-1, the ANV 350 may generate the gaze adjustment notifications 386. The gaze adjustment notifications 386, may depict visually how a wearer should view or adjust a view, using visual information, e.g., using arrows and textual indicators or instructions. The gaze adjustment notifications 386, may indicate the relative location of the vibrations 364-1 and how a wearer can change their gaze, e.g., behind the wearer of the WDD 340 on the left side. The gaze adjustment notifications 386, may indicate a reaction a user should have to view the vibrations 364-1, e.g., the wearer of the WDD 340 should look around and change their gaze to the left to view the element 362-1.

FIG. 3D depicts a third example augmented interface 390 of a wearer of a WDD 340, consistent with some embodiments of the disclosure. The third example augmented interface 390 is of the environment 360 that includes the plurality of elements 362, obstacles 368, and other objects. The third example augmented interface 390 may include one or more augmented notifications that are provided by the display 348 to a wearer of the WDD 340. The third example augmented interface 390 may include the following: one or more textual notifications 392; one or more gaze adjustment notifications 396; and, one or more obstruction notifications 398. The third interface 390 may additionally show additional information about the sound, like warnings about where a wearer of the WDD 340 should be or not (e.g., to move out of the way of various elements, if a worker can safely ignore a particular vibration, the duration of a particular vibrations should last, the reason of generated sound etc.)

The augmented notifications of augmented interface 390 may describe the environment 360. In detail, in response to vibrations 364-*n* of element 362-*n*, the ANV 350 may generate textual notifications 392. The textual notifications 392 may describe the type or kind of vibrations 364-*n* and/or vibration sources, e.g., element 362-*n* is a vehicle with a running engine. The textual notifications 392 may describe the position of elements 362 in the environment 360, e.g., element 362-*n* is behind obstacle 368-*n*. The textual notifications 392 may describe an action a user should take, e.g., element 362-*n* is moving proximate to the wearer of the WDD 340, and the wearer should move.

Further, in response to vibrations 364-*n* of element 362-*n*, the ANV 350 may generate the gaze adjustment notifications 396. The gaze adjustment notifications 396, may depict visually how a wearer should view or adjust a view, using visual information (e.g., a path shown for a shortest eye gaze movement path towards the source of sound). For example, the gaze adjustment notifications 396 may use arrows and an icon or other representation of the source of the vibrations, such as a vehicle representing element 362-*n*. The gaze adjustment notifications 396 may indicate the relative location of the vibrations 364-1 and how a wearer can change their gaze, e.g., behind the wearer of the WDD 340 on the right side. The gaze adjustment notifications 396, may indicate a reaction a user should have to view the vibrations 364-1, e.g., the wearer of the WDD 340 should look around and change their gaze to the right to view the element 362-1.

Further still, in response to vibrations 364-*n* of element 362-*n*, the ANV 350 may generate the obstruction notifications 398. The notifications 398 may include visual information that indicates there is an obstruction, such as a tree or sign, between the WDD 340 and the element 362-*n*. The obstruction notifications 398 may be placed in the augmented interface 390, to communicate their position with respect to other objects in the environment 360. For example, the obstruction notifications 398 may be placed to communicate to a user who may not be able to turn and have a clear view to the element 362-*n*.

Figure 4:
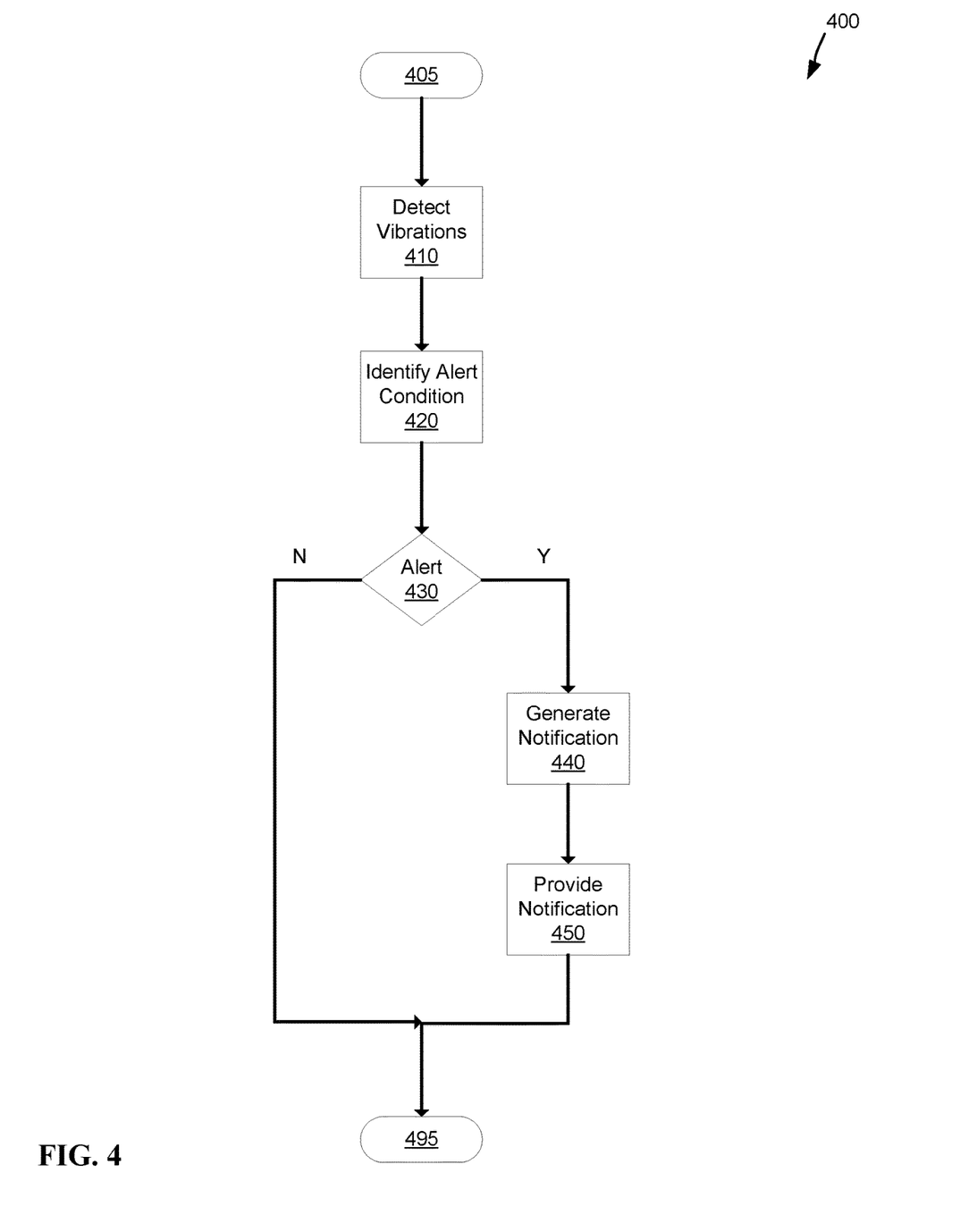
FIG. 4 depicts an example method of notifying a user, consistent with some embodiments of the disclosure.

FIG. 4 depicts an example method 400 of notifying a user, consistent with some embodiments of the disclosure. Method 400 may generally be implemented in fixed-functionality hardware, configurable logic, logic instructions, etc., or any combination thereof. For example, the logic instructions might include assembler instructions, ISA instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.). Method 400 may operate on a computer, such as computer system 100. Method 400 may operate based on a wearable display device, such as an augmented reality headset (e.g., WDD 340).

Method 400 begins at 405, as one or more environmental vibrations may be detected at 410. The environmental vibrations may originate from a vibration source in an environment. Specifically, the environmental vibrations may emanate from heavy machinery, vehicles, user, and or other elements that may be located near or adjacent to a user (e.g., within a few feet of a user, within a ten yards of a headset). The environmental vibration may be detected by one or more sensors—for example, a vibration sensor and/or microphone affixed to a headset or other wearable computing device. In another example, a vibration sensor or audio transceiver is located in an environment.

At 420, method 400 may continue by performing identification of alert conditions. The identification of alert conditions may be based on the one or more environment vibrations that are detected, at 410. The identification of alert conditions may additionally comprise determining at least one operating parameter of a machine in the environment, such as through an IoT sensor or other relevant communication channel. For example, receiving a network communication that indicates an operation—an operation that causes vibrations and/or sounds—may begin or cease. In another example, the environmental vibrations may be consistent with operational vibrations of a particular piece of heavy equipment, such as a cement mixer. In yet another example, the environmental vibrations may be inconsistent or out of spec with operational vibrations, such as a washing machine that is vibrating more or less than an acceptable range of vibrations.

If an alert condition is identified at 430:Y, method 400 may continue by generating an augmented notification at 440. The augmented notification may be generated for a wearable display device. For example, the augmented notification may be one or more computer graphics generated for a virtual reality headset. In another example, the augmented notification may be one or more computer graphics rendered for an augmented reality headset. The computer graphics may include text, renderings, images, and other depictions.

At 450 the augmented notification may be provided to the wearable display device. After the augmented notification is provided, at 450 (or if an alert condition is not identified at 430:N), method 400 may end at 495.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method comprising:
    detecting, by a wearable display device ("WDD"), one or more environmental vibrations that originate from a vibration source, wherein the WDD is worn by a user, and the vibration source is located in an environment that is proximate to the WDD;
    identifying, based on the one or more environmental vibrations, an alert condition related to the vibration source;
    generating, in response to the alert condition, an augmented notification for the WDD; and providing, by the WDD, the augmented notification to the user;

determining, from the one or more environmental vibrations, a relative position of the vibration source;

generating, based on the relative position, direction information that indicates the relative position of the vibration source to the user; and updating, based on the direction information and before the providing, the augmented notification.

2. The method of claim 1, wherein:

the one or more environmental vibrations include auditory vibrations, and includes a plurality of microphones that are configured to detect the auditory vibrations.

3. The method of claim 1, further comprising:

monitoring one or more user parameters related to the user; and updating, based on the user parameters, the augmented notification.

4. The method of claim 3, wherein the user parameters are selected from the group consisting of: a health status of the user, a gaze of the user, a view of the user, a position of the user, and an orientation of the user.

5. The method of claim 1, wherein the vibration source includes at least one machine that is located in the environment.

6. The method of claim 5, wherein:

the machine is communicatively coupled to an Internet of Things ("IoT") sensor, and the detecting the one or more environmental vibrations is based on communication, through the IoT sensor, with the machine.

7. The method of claim 6, wherein:

the environmental vibrations of the machine are consistent with the operational vibrations of the operating parameters, and the augmented notification indicates the operating parameters to the user.

8. The method of claim 5, wherein the identifying the alert condition comprises:

determining one or more operating parameters of the machine, the operating parameters indicate one or more operational vibrations of the machine; and comparing the operational vibrations to the environmental vibrations.

9. The method of claim 6, wherein:

the environmental vibrations of the machine are not consistent with the operational vibrations of the operating parameters, and the augmented notification includes a warning related to the machine.

10. The method of claim 1, wherein:

the alert status indicates that the environmental vibrations are consistent with danger in the environment, and the augmented notification includes a warning related to the vibration source.

11. A method comprising:

detecting, by a wearable display device ("WDD"), one or more environmental vibrations that originate from a vibration source, wherein the WDD is worn by a user, and the vibration source is located in an environment that is proximate to the WDD;

identifying, based on the one or more environmental vibrations, an alert condition related to the vibration source;

generating, in response to the alert condition, an augmented notification for the WDD;

providing, by the WDD, the augmented notification to the user;

determining, from the one or more environmental vibrations, a relative position of the vibration source;

determining, based on the relative position, a relative orientation of the user to the vibration source;

generating, based on the relative orientation, gaze change instructions that indicate a change in a gaze of the user; and updating, based on the gaze change instructions and before the providing, the augmented notification.

12. A method comprising:

detecting, by a wearable display device ("WDD"), one or more environmental vibrations that originate from a vibration source, wherein the WDD is worn by a user, and the vibration source is located in an environment that is proximate to the WDD;

identifying, based on the one or more environmental vibrations, an alert condition related to the vibration source;

generating, in response to the alert condition, an augmented notification for the WDD; providing, by the WDD, the augmented notification to the user;

determining, based on a first machine learning technique and before the one or more environmental vibrations, a future environmental vibration in the environment, wherein the first machine learning technique is trained based on previous environmental vibrations in the environment; and updating, based on the future environmental vibration and before the providing, the augmented notification.

* * * * *